US012687771B2

(12) United States Patent
Yamagishi et al.

(10) Patent No.: US 12,687,771 B2
(45) Date of Patent: Jul. 21, 2026

(54) PHOSPHOR WHEEL AND PROJECTION IMAGE DISPLAY DEVICE

(71) Applicant: Panasonic Intellectual Property Management Co., Ltd., Osaka (JP)

(72) Inventors: Shigekazu Yamagishi, Osaka (JP); Takashi Ikeda, Osaka (JP); Masato Tanaka, Kyoto (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 362 days.

(21) Appl. No.: 18/207,371

(22) Filed: Jun. 8, 2023

(65) Prior Publication Data

US 2023/0314920 A1 Oct. 5, 2023

Related U.S. Application Data

(63) Continuation of application No. PCT/JP2021/036991, filed on Oct. 6, 2021.

(30) Foreign Application Priority Data

Dec. 10, 2020 (JP) ................................. 2020-205212

(51) Int. Cl.
*G03B 21/16* (2006.01)
*G02B 26/00* (2006.01)
*G03B 21/20* (2006.01)
(52) U.S. Cl.
CPC ........... *G03B 21/16* (2013.01); *G02B 26/008* (2013.01); *G03B 21/204* (2013.01)
(58) Field of Classification Search
CPC ...... G03B 21/16; G03B 21/204; G03B 21/14; G02B 26/008; F21Y 2115/30; F21S 2/00;
(Continued)

(56) References Cited

U.S. PATENT DOCUMENTS

2006/0181853 A1* 8/2006 Jeong ................. H05K 7/20963
361/704
2017/0099467 A1* 4/2017 Egawa ................. H04N 9/3158
(Continued)

FOREIGN PATENT DOCUMENTS

CN 110864271 3/2020
CN 210465979 5/2020
(Continued)

OTHER PUBLICATIONS

International Search Report issued Nov. 16, 2021 in International (PCT) Application No. PCT/JP2021/036991.
(Continued)

*Primary Examiner* — Magda Cruz

(74) *Attorney, Agent, or Firm* — Wenderoth, Lind & Ponack, L.L.P.

(57) ABSTRACT

A phosphor wheel includes a substrate that has a disk shape, and includes a first main surface, a second main surface opposite to the first main surface, and an opening. A phosphor layer has a curved shape and is provided along a circumferential direction of the substrate on the first main surface, and the phosphor layer is provided side by side with the opening in the circumferential direction in plan view. A heat dissipation fin is provided on the second main surface, and a projection is provided on the second main surface, and is different from the heat dissipation fin. The heat dissipation fin and the projection are disposed integrally with the substrate.

15 Claims, 7 Drawing Sheets

(58) Field of Classification Search

CPC . F21V 9/32; F21V 9/38; F21V 29/502; F21V
29/77; H04N 9/31

USPC .......................................................... 353/31

See application file for complete search history.

(56) References Cited

U.S. PATENT DOCUMENTS

| | | | | |
|---|---|---|---|---|
| 2017/0261844 | A1* | 9/2017 | Kitade ................. | H04N 9/3158 |
| 2017/0269463 | A1* | 9/2017 | Katsumata ............. | G02B 7/008 |
| 2018/0031957 | A1* | 2/2018 | Egawa ................. | H04N 9/3158 |
| 2018/0095350 | A1* | 4/2018 | Tanaka ................... | G03B 21/16 |
| 2018/0136457 | A1 | 5/2018 | Chang et al. | |
| 2019/0049828 | A1 | 2/2019 | Maeda | |
| 2019/0171097 | A1 | 6/2019 | Fujii | |
| 2020/0310233 | A1* | 10/2020 | Kadotani ........... | H05K 7/20327 |

FOREIGN PATENT DOCUMENTS

| | | | | |
|---|---|---|---|---|
| JP | 2004-279550 | 10/2004 | | |
| JP | 2006-64785 | 3/2006 | | |
| JP | 2012013897 A | * 1/2012 | ............. | G03B 21/14 |
| JP | 2016-153873 | 8/2016 | | |
| JP | 2019-32506 | 2/2019 | | |
| JP | 2019-101201 | 6/2019 | | |
| JP | 2020-20912 | 2/2020 | | |

OTHER PUBLICATIONS

Chinese 1st Office Action issued Jan. 15, 2026 in corresponding
Chinese Patent Application No. 202180082143.X, with English
machine translation.

* cited by examiner

PHOSPHOR WHEEL AND PROJECTION IMAGE DISPLAY DEVICE

TECHNICAL FIELD

The present disclosure relates to a phosphor wheel included in a projection image display device of a field sequential system.

BACKGROUND ART

A projector of a field-sequential system including a wavelength conversion device called a phosphor wheel or the like has been known (see, for example, Unexamined Japanese Patent Publication No. 2004-279550 (hereinafter "JP '550") and Unexamined Japanese Patent Publication No. 2016-153873 (hereinafter "JP '873")).

CITATION LIST

Patent Literature

A projection image display device of a field sequential system in which color display of an image is realized by sequentially switching between light rays of colors of RGB by using a digital micromirror device (DMD) which is an image display element capable of giving a high-speed response has been put on the market.

JP '550 discloses a projection display device of a field sequential system. The projection display device includes a color wheel (color filter) that sequentially switches between color light rays of RGB at a high speed, and a space without a color filter is provided in the color wheel. In order to adjust a weight balance due to the formation of the space, a balance weight is provided in a central member of the color wheel.

In addition, JP '873 discloses a projector of a field sequential system. The projector includes a wavelength conversion device. The wavelength conversion device (hereinafter, also referred to as a phosphor wheel) includes a disk having a first surface and a second surface, a wavelength conversion element provided on the first surface, and a heat sink provided on the second surface and separated from a base. In such a wavelength conversion device, a balance adjustment member may be arranged to adjust a rotation balance of the disk.

Incidentally, in a case where an opening is provided in the phosphor wheel, there is room for examination on a method for reducing an imbalance of a mass distribution caused by the opening. A method for attaching another member as in JP '550 and JP '873 may be useful when the imbalance of the mass distribution is finely adjusted, but is not suitable in a case where the opening is large to some extent.

SUMMARY OF THE INVENTION

The present disclosure provides a phosphor wheel in which a mass distribution imbalance is reduced.

A phosphor wheel according to one aspect of the present disclosure includes a substrate that has a disk shape, and includes a first main surface, a second main surface opposite to the first main surface, and an opening, a phosphor layer that has a curved shape and is provided along a circumferential direction of the substrate on the first main surface, the phosphor layer being provided side by side with the opening in the circumferential direction in plan view, a heat dissipation fin that is provided on the second main surface, and a projection that is provided on the second main surface, and is different from the heat dissipation fin. The heat dissipation fin and the projection are disposed integrally with the substrate.

According to the present disclosure, a phosphor wheel in which a mass distribution imbalance is reduced is realized.

DESCRIPTION OF EMBODIMENT

Figure 1:
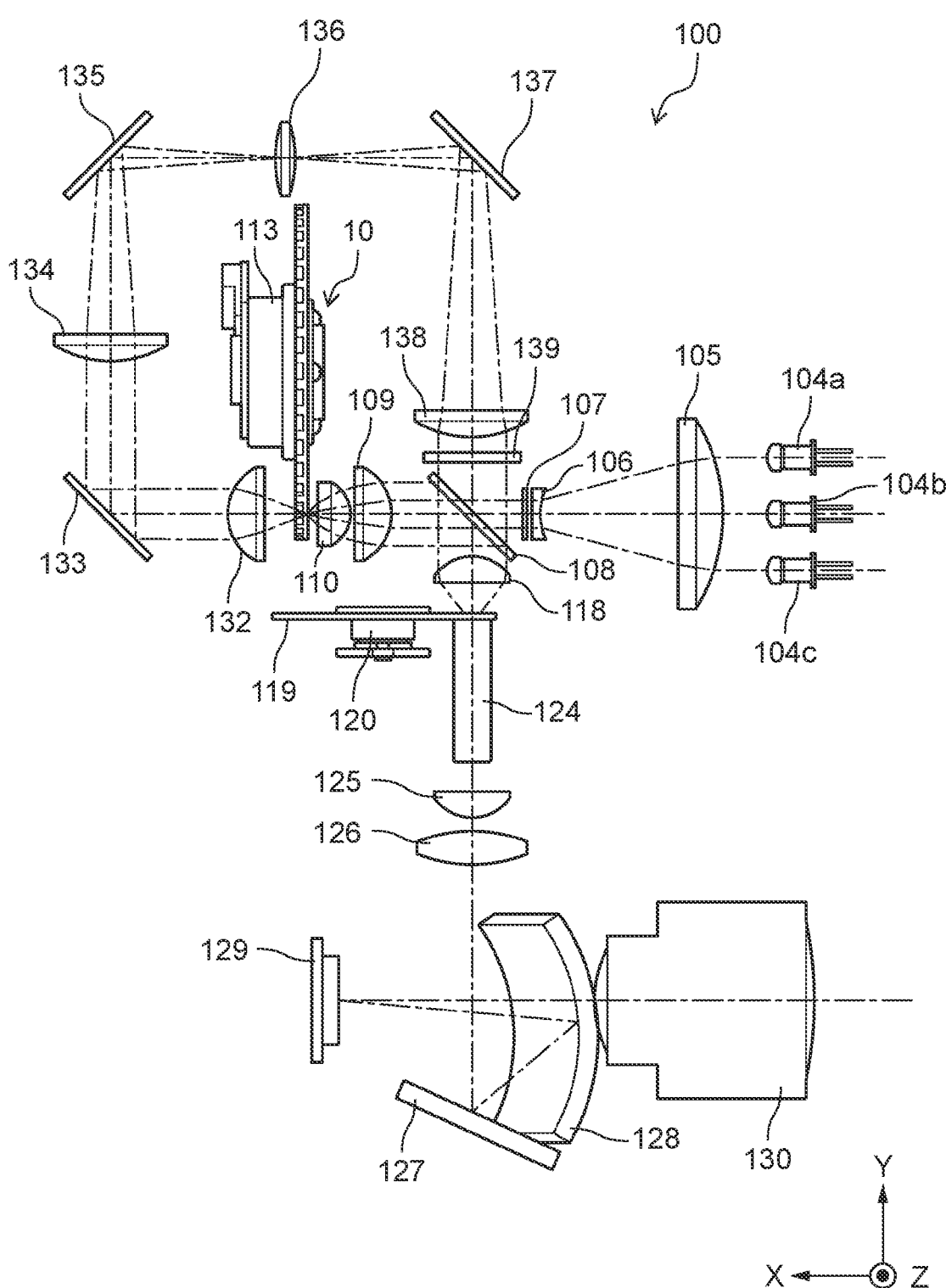
FIG. 1 is a diagram illustrating a configuration of a projection image display device according to an exemplary embodiment.

Hereinafter, an exemplary embodiment is specifically described with reference to the drawings. Note that, the exemplary embodiment to be described below provides a comprehensive or specific example. Numerical values, shapes, materials, constituent elements, arrangement positions and connection forms of the constituent elements, steps, processing order of the steps, and the like illustrated in the following exemplary embodiment are just an example, and are not intended to limit the present disclosure. In addition, of constituent elements in the following exemplary embodiment, constituent elements that are not recited in the independent claims will be described as optional constituent elements.

In addition, each of the drawings is a schematic diagram, and is not necessarily precisely illustrated. Note that, in the drawings, substantially identical configurations are designated by the same reference marks, and duplicate description may be omitted or simplified.

Exemplary Embodiment

[Configuration of Projection Image Display Device]

Hereinafter, a projection image display device according to an exemplary embodiment will be described. FIG. 1 is a diagram illustrating a configuration of the projection image display device according to the exemplary embodiment. In FIG. 1, a right direction is defined as an X-axis plus direction, an upper direction is defined as a Y-axis plus direction, and a direction toward a front side of a paper surface is defined as a Z-axis plus direction.

As illustrated in FIG. 1, projection image display device 100 includes laser light sources 104a, 104b, and 104c, condenser lenses 105 and 106, diffuser plate 107, dichroic mirror 108, excitation lenses 109 and 110, phosphor wheel 10, motor 113, relay lenses 132, 134, 136, and 138, mirrors 133, 135, and 137, diffuser plate 139, condenser lens 118, color filter 119, motor 120, rod integrator 124, relay lenses 125 and 126, folding mirrors 127 and 128, DMD 129, and projection lens 130.

Laser light sources 104a, 104b, and 104c emit blue light for exciting a phosphor layer included in phosphor wheel 10. In other words, laser light sources 104a, 104b, and 104c irradiate the phosphor layer with the blue light. Note that, the blue light is, for example, monochromatic light in which a center wavelength of an emission spectrum is 455 nm. Laser light sources 104a, 104b, and 104c are realized by, for example, semiconductor lasers.

Each of laser light sources 104a, 104b, and 104c includes a collimating lens at an emission port, and emits blue collimated light forward (in the X-axis plus direction). The emitted blue collimated light is incident on condenser lens 105, and the light condensed by condenser lens 105 is incident on condenser lens 106. Condenser lens 106 is a concave lens. Blue collimated light emitted from laser light sources 104a, 104b, and 104c is converted into collimated light having a small diameter by condenser lens 106, and then enters diffuser plate 107.

Diffuser plate 107 improves uniformity of the blue collimated light by diffusing the blue collimated light incident on diffuser plate 107. The light transmitted through diffuser plate 107 is incident on dichroic mirror 108.

Dichroic mirror 108 has a characteristic that transmits blue light and reflects light rays having luminescent colors other than blue light. Since the light transmitted through diffuser plate 107 is blue light, the blue light is transmitted through dichroic mirror 108 and is condensed by excitation lenses 109 and 110 to form a condensed spot on phosphor wheel 10.

As will be described later, in phosphor wheel 10, a red phosphor layer, a green phosphor layer, and an opening are positioned on an identical circumference, and the condensed spot is formed on a circumference. The red phosphor layer emits red fluorescent light when irradiated with blue light, and the green phosphor layer emits green fluorescent light when irradiated with blue light. When phosphor wheel 10 is rotated by motor 113, emission of red fluorescent light to dichroic mirror 108 side, emission of green fluorescent light to dichroic mirror 108 side, and passage of blue light to relay lens 132 side are sequentially performed.

Red fluorescent light and green fluorescent light emitted from phosphor wheel 10 are incident on dichroic mirror 108 through excitation lenses 109 and 110. As described above, since dichroic mirror 108 has a characteristic that reflects visible light other than blue light, the dichroic mirror reflects red fluorescent light and green fluorescent light, and the reflected red fluorescent light and green fluorescent light pass through condenser lens 118 and are incident on color filter 119.

On the other hand, the blue light having passed through the opening provided in phosphor wheel 10 is diffused by diffuser plate 139 through a relay optical path of the blue light formed by relay lenses 132, 134, 136, and 138 and mirrors 133, 135, and 137. The diffused blue light is transmitted through dichroic mirror 108, passes through condenser lens 118, and is incident on color filter 119.

Figures 2, 3:
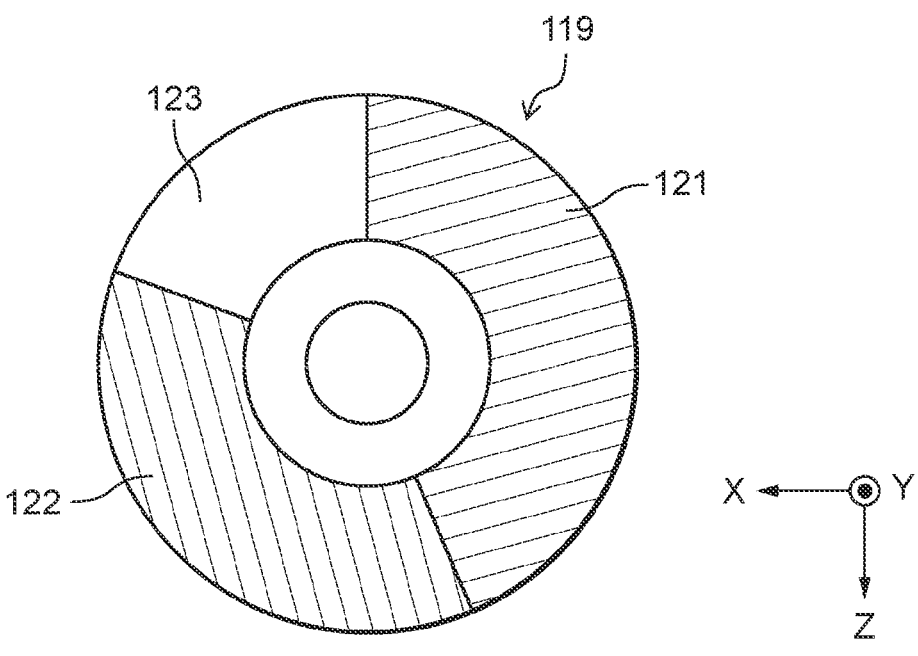
FIG. 2 is a diagram of a color filter included in the projection image display device according to the exemplary embodiment as viewed from a light incident side.
FIG. 3 is a plan view of a phosphor wheel according to the exemplary embodiment as viewed from a first main surface side.

As described above, red fluorescent light, green fluorescent light, and blue light are sequentially incident on color filter 119. FIG. 2 is a diagram of color filter 119 as viewed from a light incident side. As illustrated in FIG. 2, color filter 119 includes red transmission filter 121 that selectively transmits only red light, green transmission filter 122 that selectively transmits only green light, and transparent glass 123 obtained by applying an antireflection treatment to transparent glass.

A central portion of color filter 119 is fixed to a motor hub of motor 120, and color filter 119 is rotated by motor 120 in synchronization with phosphor wheel 10. Specifically, synchronization is performed such that red fluorescent light is incident on red transmission filter 121, green fluorescent light is incident on green transmission filter 122, and blue light is incident on transparent glass 123. According to red transmission filter 121, unnecessary wavelength components included in red fluorescent light are removed, and according to green transmission filter 122, unnecessary wavelength components included in green fluorescent light are removed. Consequently, a desired color purity is realized.

As described above, red light, green light, and blue light are emitted from color filter 119 in a time-division manner. The light emitted from color filter 119 is incident on rod integrator 124, repeats total internal reflection in rod integrator 124, and then is emitted from rod integrator 124. The light emitted from rod integrator 124 is incident on DMD 129 through relay lenses 125 and 126 and folding mirrors 127 and 128.

DMD 129 is an example of an image display element, and modulates light emitted from phosphor wheel 10 (phosphor layer) in accordance with laser light emitted by laser light sources 104a, 104b, and 104c based on an image signal. DMD 129 includes a base portion and a plurality of micromirrors provided on the base portion.

An inclination angle of each of the plurality of micromirrors is changed in an alternative manner based on the image signal. Specifically, the inclination angle of each of the plurality of micromirrors is selectively changed to a first inclination angle at which the light incident on the micromirror is emitted toward projection lens 130 and a second inclination angle at which the light incident on the micromirror is emitted in a direction not toward projection lens 130.

DMD 129 emits a red image to projection lens 130 based on an R signal of the image signal during a period in which the red light is incident on DMD 129, emits a green image to projection lens 130 based on a G signal of the image signal during a period in which the green light is incident on DMD 129, and emits a blue image to projection lens 130 based on a B signal of the image signal during a period in which the blue light is incident on DMD 129. That is, an operation of DMD 129 is synchronized with phosphor wheel 10 and color filter 119, and the red image, the green image, and the blue image are switched at a high speed.

Projection lens 130 projects light (that is, the image) modulated by DMD 129. A color image is projected on a screen by projection lens 130.

Note that, a reflection liquid crystal panel (LCOS: Liquid Crystal On Silicon) may be used as the image display element instead of DMD 129. In addition, projection image display device 100 may include a transmission image display element such as a transmission liquid crystal panel instead of the reflection image display element such as DMD 129 and the reflection liquid crystal panel.

As described above, projection image display device 100 can display a color image.

[Configuration of Phosphor Wheel]

Figure 4:
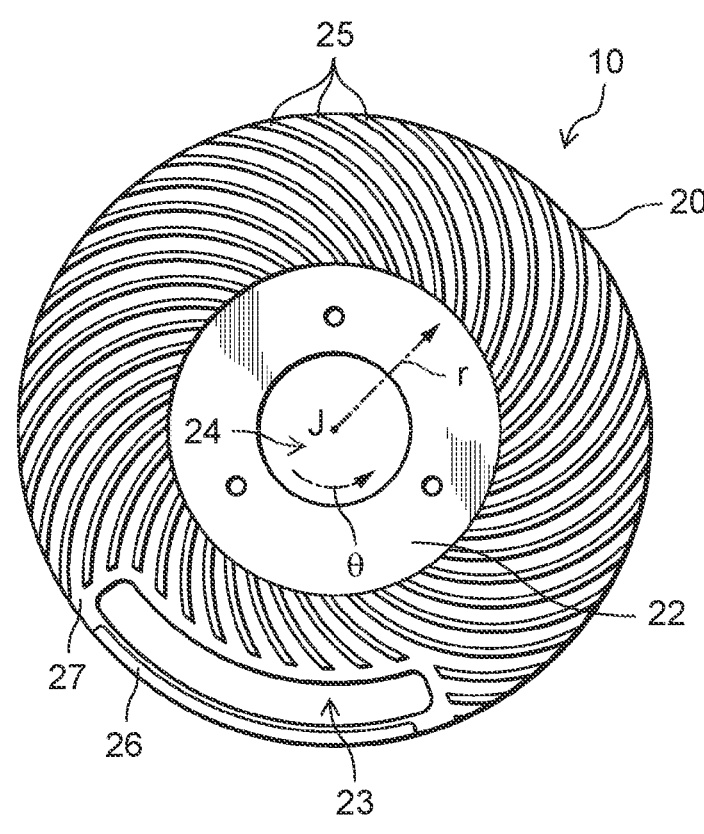
FIG. 4 is a plan view of the phosphor wheel according to the exemplary embodiment as viewed from a second main surface side.
Figure 5:
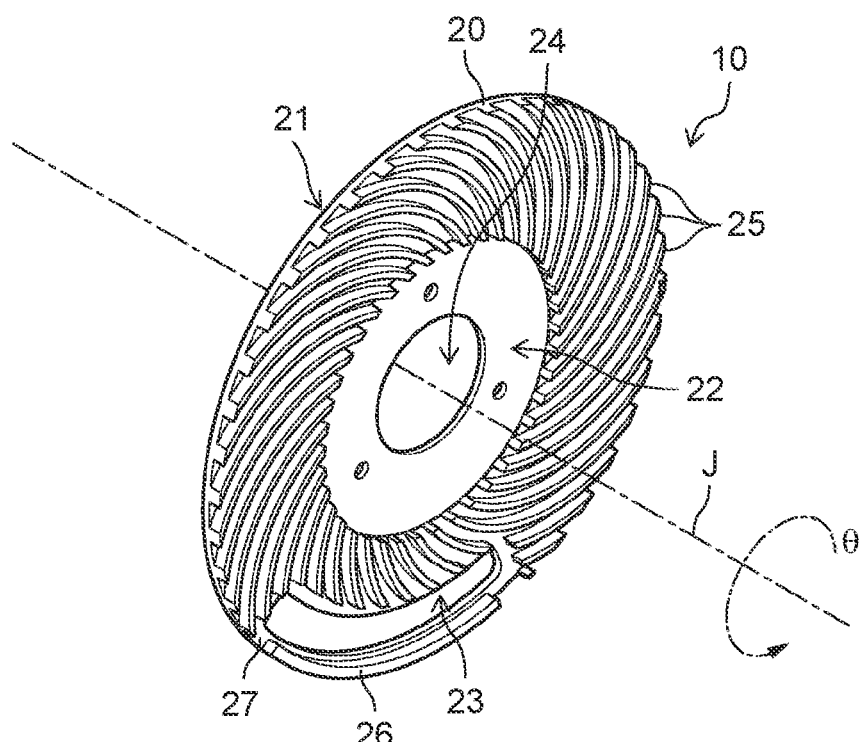
FIG. 5 is a perspective view of the phosphor wheel according to the exemplary embodiment as viewed from the second main surface side.

Next, a structure of phosphor wheel 10 will be described in detail. FIG. 3 is a plan view of the phosphor wheel according to the exemplary embodiment as viewed from a first main surface side. FIG. 4 is a plan view of the phosphor wheel according to the exemplary embodiment as viewed from a second main surface side. FIG. 5 is a perspective view of the phosphor wheel according to the exemplary embodiment as viewed from the second main surface side. Note that, the first main surface is a main surface of phosphor wheel 10 on dichroic mirror 108 side, and the second main surface is a main surface opposite to the first main surface. Note that, in the following exemplary embodiment, a radial direction of a circle having virtual rotation axis J (illustrated in FIGS. 3 to 5) as a center is referred to as radial direction r (illustrated in FIGS. 3 and 4), and a circumferential direction of the circle having rotation axis J as a center is referred to as circumferential direction θ (illustrated in FIG. 5).

As illustrated in FIGS. 3 to 5, phosphor wheel 10 includes substrate 20 and phosphor layer 30. Phosphor wheel 10 is an optical member used in projection image display device 100. Phosphor layer 30 included in phosphor wheel 10 emits light by being irradiated with laser light. At this time, although half of energy becomes heat, when a temperature of phosphor particles contained in phosphor layer 30 is more than or equal to a certain temperature, conversion efficiency decreases and the amount of generated heat increases. When the amount of generated heat increases, there is a concern about reliability such as deterioration of a resin material contained in phosphor layer 30.

Therefore, in order to avoid irradiation of laser light intensively to one point of phosphor layer 30, phosphor wheel 10 rotates having rotation axis J as a center by motor 113 while phosphor layer 30 is irradiated with the laser light. Consequently, continuous irradiation of the same portion of phosphor layer 30 with laser light is suppressed. That is, the deterioration of the phosphor particles contained in phosphor layer 30 due to heat generation is suppressed. In addition, substrate 20 is made of a thermally conductive material such as aluminum, and thus, heat dissipation of phosphor layer 30 is enhanced.

Substrate 20 is a substrate having a disk shape and having rotation axis J as a center. In other words, a shape of substrate 20 is circular in plan view. Note that, the shape in plan view is a shape as viewed from a direction perpendicular to first main surface 21 (or second main surface 22) of substrate 20. Substrate 20 includes first main surface 21, second main surface 22 opposite to first main surface 21, and opening 23.

In addition, main opening 24 is provided at a center of substrate 20, and a rotor of a motor (not illustrated in FIGS. 3 to 5) is connected to main opening 24. Rotation axis J passes through the center (center position) of substrate 20, and substrate 20 is rotated about rotation axis J by the motor.

Substrate 20 is made of, for example, aluminum, an alloy containing aluminum, or a metal having good thermal conductivity such as copper.

Phosphor layer 30 is disposed on first main surface 21 of substrate 20. Phosphor layer 30 has a curved shape along circumferential direction θ of substrate 20. That is, phosphor layer 30 has an arc shape. Phosphor layer 30 is positioned side by side with opening 23 in circumferential direction θ. That is, phosphor layer 30 and opening 23 are positioned on an identical circumference. In addition, in phosphor wheel 10, a width of phosphor layer 30 in radial direction r is constant, and a width of phosphor layer 30 in radial direction r is equal to a width of opening 23 in radial direction r. That is, in the present exemplary embodiment, opening 23 has a curved shape as illustrated in FIG. 3. Opening 23 and phosphor layer 30 form a ring shape in plan view.

Specifically, phosphor layer 30 includes red phosphor layer 30$r$ and green phosphor layer 30$g$. Red phosphor layer 30$r$ is made of a resin material containing a large number of red phosphor particles. Specifically, the red phosphor particles include $CaAlSiN_3:Eu^{2+}$ or $(Sr,Ca)AlSiN_3:Eu^{2+}$. Note that red phosphor layer 30$r$ may contain phosphor particles that emit fluorescent light of color other than red.

Green phosphor layer 30$g$ is made of a resin material containing a large number of green phosphor particles. Specifically, the green phosphor particles include $Y_3(Al,Ga)_5O_{12}:Ce^{3+}$ or $Lu_3Al_5O_{12}:Ce^{3+}$. Note that green phosphor layer 30$g$ may contain phosphor particles that emit fluorescent light of a color other than green.

A base of the resin material is, for example, a silicone resin having light transparency and thermosetting properties. Phosphor layer 30 is formed, for example, by bonding a cured resin material containing phosphor particles separately generated to substrate 20 with an adhesive material having light reflectivity. The adhesive is made of, for example, a resin binder containing titanium oxide or the like, and also functions as a light reflecting layer. Note that, phosphor layer 30 may be formed by screen printing an uncured resin material containing phosphor particles on first main surface 21 of substrate 20 and then heating and curing the resin material in a heating furnace. Note that, although not illustrated in FIGS. 3 to 5, a light reflecting film may be provided between first main surface 21 of substrate 20 and phosphor layer 30.

Each of red phosphor layer 30$r$ and green phosphor layer 30$g$ has a curved shape along circumferential direction θ, and one end portions in circumferential direction θ are connected to each other. In addition, in plan view, opening 23 is positioned between the other end of red phosphor layer 30$r$ and the other end of green phosphor layer 30$g$, and opening 23 also has a curved shape along circumferential direction θ. Note that, opening 23 is a through-hole for transmitting laser light (blue light).

With such a configuration, phosphor wheel 10 can cause red, green, and blue light to be incident on DMD 129 in a time-division manner.

Note that, it is not essential that phosphor layer 30 include red phosphor layer 30$r$ and green phosphor layer 30$g$, and phosphor layer 30 may be a single yellow phosphor layer formed of a resin material containing a large number of yellow phosphor particles.

The yellow phosphor particles are, for example, yttrium aluminum garnet (YAG)-based yellow fluorescent body particles. Color filter 119 is also used in such phosphor layer 30, and thus, red, green, and blue light can be incident on DMD 129 in a time-division manner.

In order to enhance the heat dissipation of phosphor layer 30, a plurality of heat dissipation fins 25 are provided on second main surface 22 of substrate 20. The plurality of heat dissipation fins 25 are provided over substantially entire second main surface 22 of substrate 20. In plan view, each of the plurality of heat dissipation fins 25 has an arc shape not having rotation axis J as a center, and the plurality of heat dissipation fins 25 has a vortex shape as a whole. Note that it is not essential that the plurality of heat dissipation fins 25 have a vortex shape. The plurality of heat dissipation fins 25 may be arranged in any manner such as being arranged radially. The arrangement of the plurality of heat dissipation fins 25 may be determined empirically or experimentally as appropriate.

The plurality of heat dissipation fins 25 are formed integrally with substrate 20 (more specifically, a main body of substrate 20) by, for example, cutting a base of substrate 20. Cutting is performed by a tool such as an end mill, for example, but may be performed by a laser. The plurality of heat dissipation fins 25 have cutting marks.

In addition, projection 26 are provided on second main surface 22 of substrate 20 in an aspect different from heat dissipation fins 25. The plurality of heat dissipation fins 25 have a vortex shape as a whole, whereas projection 26 has a curved shape (in other words, an arc shape having rotation axis J as a center) along circumferential direction θ. Similarly to the plurality of heat dissipation fins 25, projection 26 is formed integrally with substrate 20 by cutting the base of substrate 20. Projection 26 has a cutting mark.

Projection 26 is provided to reduce an imbalance (moment imbalance) of a mass distribution of phosphor wheel 10 due to provision of opening 23. In other words, projection 26 is provided at a position where the imbalance of the mass distribution of phosphor wheel 10 due to the provision of opening 23 is reduced.

Specifically, projection 26 is positioned on an outer peripheral side with respect to opening 23 and is positioned side by side with opening 23 in radial direction r. As described above, when projection 26 is positioned in a region on the outer peripheral side with respect to opening 23, it is possible to reduce the imbalance of the mass distribution caused by opening 23 due to projection 26 having a mass smaller than a mass reduced by providing opening 23. That is, it is possible to reduce the imbalance of the mass distribution while an increase in the overall weight is suppressed. In addition, when projection 26 has a curved shape along opening 23, a region near opening 23 can be structurally reinforced. Note that, the mass of projection 26 is determined by a height of projection 26, a length of projection 26 in circumferential direction θ, and a width of projection 26 in radial direction r. In other words, the height of projection 26 is the length of projection 26 in a direction perpendicular to second main surface 22.

A position of projection 26 and the mass of projection 26 are adjusted, and thus, a residual imbalance of phosphor wheel 10 is less than or equal to an allowable residual imbalance. A design residual imbalance can be 0.

Incidentally, in phosphor wheel 10, region 27 of second main surface 22 near opening 23 is flat, and heat dissipation fin 25 and projection 26 are not provided in region 27 near the opening. Consequently, it is possible to prevent the laser light transmitted through opening 23 from hitting the plurality of heat dissipation fins 25 and projection 26 and becoming stray light (unnecessary light) or a heat source. Note that a maximum dimension of the width of projection 26 in radial direction r is limited such that the laser light transmitted through opening 23 does not hit the projection.

When the laser light does not reach the plurality of heat dissipation fins 25 and projection 26, the plurality of heat dissipation fins 25 and projection 26 may reach a region near an end surface of opening 23.

In addition, the height of projection 26 may be different from a height of heat dissipation fin 25, but in phosphor wheel 10, the height of projection 26 is equal to the height of heat dissipation fin 25. When the height of projection 26 is equal to the height of heat dissipation fin 25, the plurality of heat dissipation fins 25 and projection 26 can be formed in the same cutting process. That is, the manufacturing process of phosphor wheel 10 (substrate 20) can be simplified, and the cost can be reduced. In a case where the height of projection 26 and the height of heat dissipation fin 25 are equal, the mass of projection 26 may be adjusted mainly by the length in circumferential direction θ.

Figure 6:
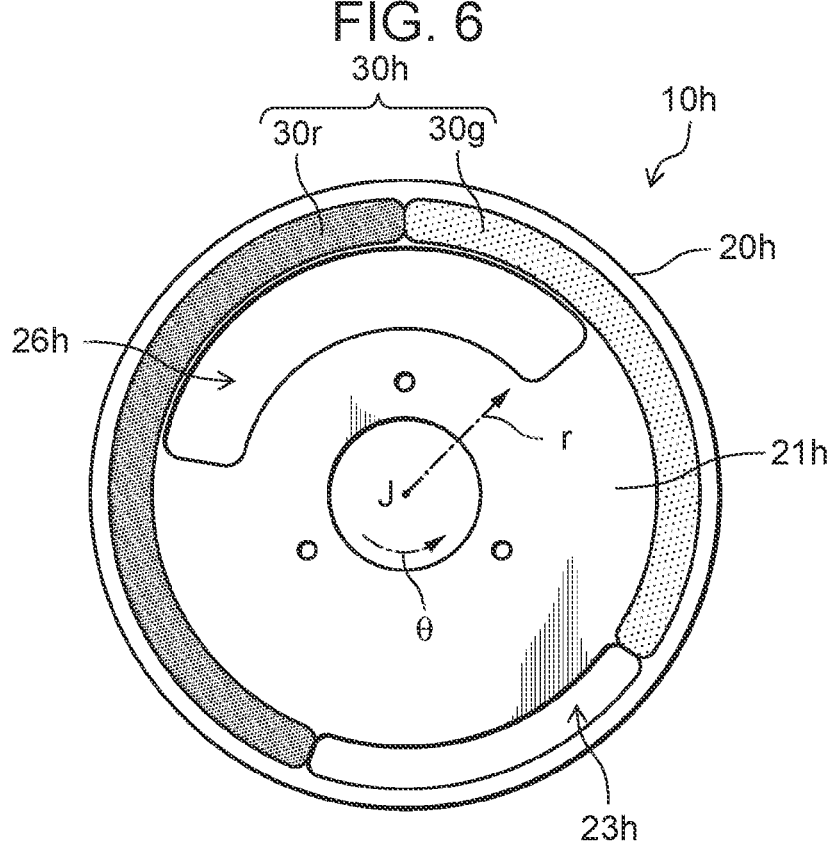
FIG. 6 is a plan view of a phosphor wheel according to a comparative example as viewed from a first main surface side.

Hereinafter, advantages obtained by phosphor wheel 10 will be described based on comparison with the phosphor wheel according to a comparative example. FIG. 6 is a plan view of the phosphor wheel according to the comparative example as viewed from the first main surface side, and FIG. 7 is a plan view of the phosphor wheel according to the comparative example as viewed from the second main surface side.

Figure 7:
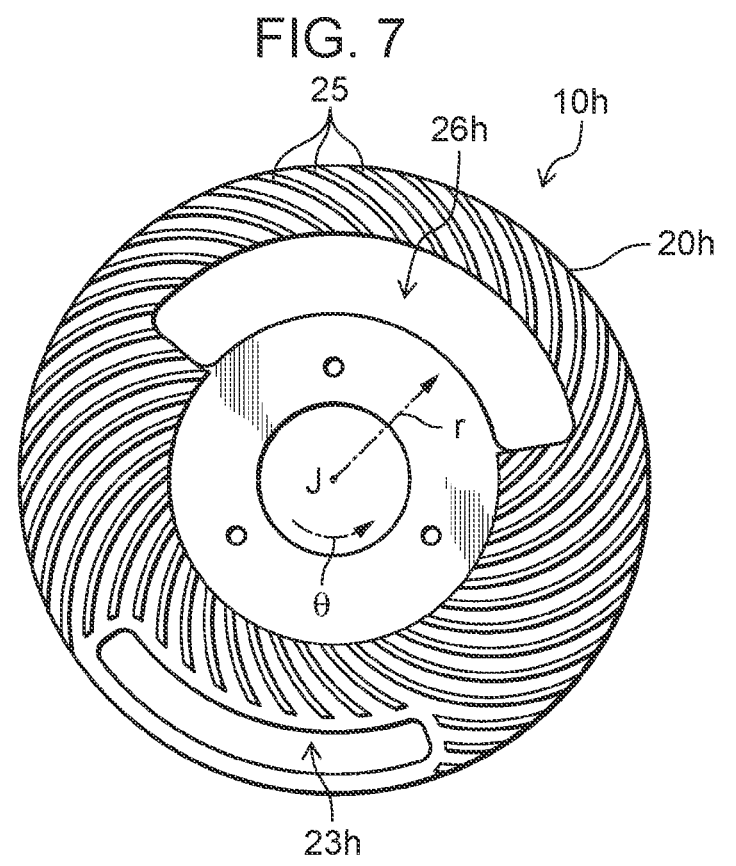
FIG. 7 is a plan view of the phosphor wheel according to the comparative example as viewed from a second main surface side.

Phosphor wheel 10h illustrated in FIGS. 6 and 7 includes substrate 20h in which phosphor layer 30 is provided on first main surface 21h and a plurality of heat dissipation fins 25h are provided on second main surface 22h. In addition, opening 23h is provided in substrate 20h. Opening 26h is provided in substrate 20h in order to reduce an imbalance of a mass distribution of phosphor wheel 10h due to opening 23h.

As described above, in order to reduce an imbalance of a mass distribution by opening 26h, opening 26h needs to be provided at a position opposite to opening 23h with rotation axis J interposed therebetween and not overlapping with phosphor layer 30. By doing this, opening 26h is provided on an inner peripheral side with respect to phosphor layer 30 in terms of a space. In order to solve the imbalance of the mass distribution, opening 26h needs to be formed larger than opening 23h. In a case where opening 26h is large, there may be disadvantages such as deterioration in flatness of a region of first main surface 21h where phosphor layer 30 is provided, and deterioration in the heat dissipation due to reduction in heat capacity of substrate 20h.

In contrast, in phosphor wheel 10, the imbalance of the mass distribution of phosphor wheel 10 is reduced by projection 26, and thus, it is possible to suppress the deterioration in the flatness of first main surface 21 and the deterioration in the heat dissipation.

[First Variation]

Figure 8:
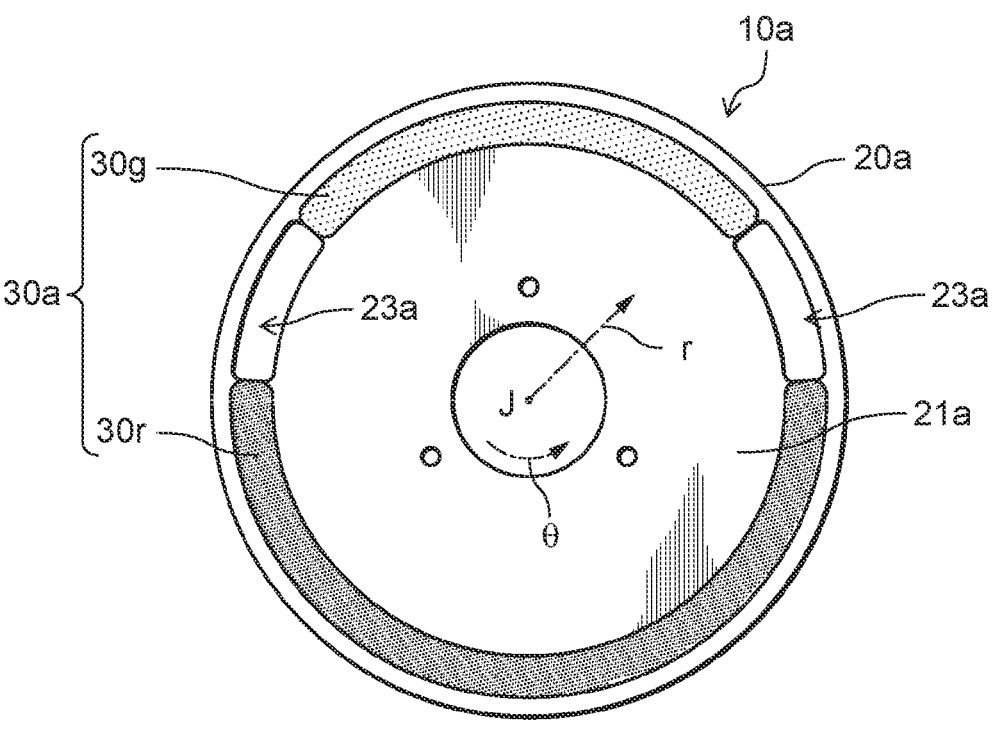
FIG. 8 is a plan view of a phosphor wheel according to a first variation as viewed from a first main surface side.
Figure 9:
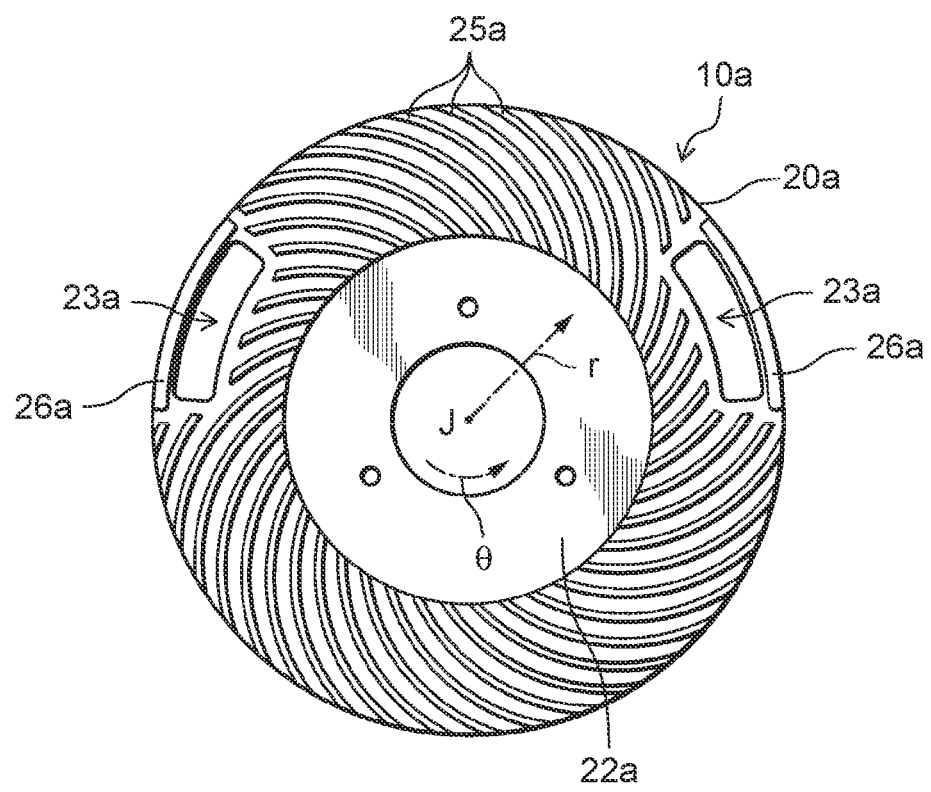
FIG. 9 is a plan view of the phosphor wheel according to the first variation as viewed from a second main surface side.

In a case where a decrease in strength of substrate 20 is concerned due to the long length of opening 23 in circumferential direction θ, it is possible to shorten a length of one opening in circumferential direction θ by providing openings at two or more portions. FIG. 8 is a plan view of a phosphor wheel according to the first variation as viewed from a first main surface side. FIG. 9 is a plan view of the phosphor wheel according to the first variation as viewed from a second main surface side. In the first variation, description of matters similar to the matters of phosphor wheel 10 will be appropriately omitted, and description will be made focusing on a difference from phosphor wheel 10.

Phosphor wheel 10a illustrated in FIGS. 8 and 9 includes substrate 20a in which phosphor layer 30a is provided on first main surface 21a and a plurality of heat dissipation fins 25a are provided on second main surface 22a. In addition, two openings 23a are provided in substrate 20a.

Red phosphor layer 30r and green phosphor layer 30g included in phosphor layer 30a are positioned side by side with two openings 23a in circumferential direction θ. That is, red phosphor layer 30r, green phosphor layer 30g, and two openings 23a are positioned on an identical circumference.

Two projections 26a corresponding to two openings 23a are provided on second main surface 22a. Each of two projections 26a has a curved shape along circumferential direction θ, is positioned on an outer peripheral side with respect to corresponding opening 23a, and is positioned side by side with corresponding opening 23a in radial direction r.

As described above, in a case where two openings 23a are provided in substrate 20a, projection 26 is provided on an outer peripheral side of each of two openings 23a, and thus, the imbalance of the mass distribution of phosphor wheel 10a can be reduced.

[Second Variation]

Figure 10:
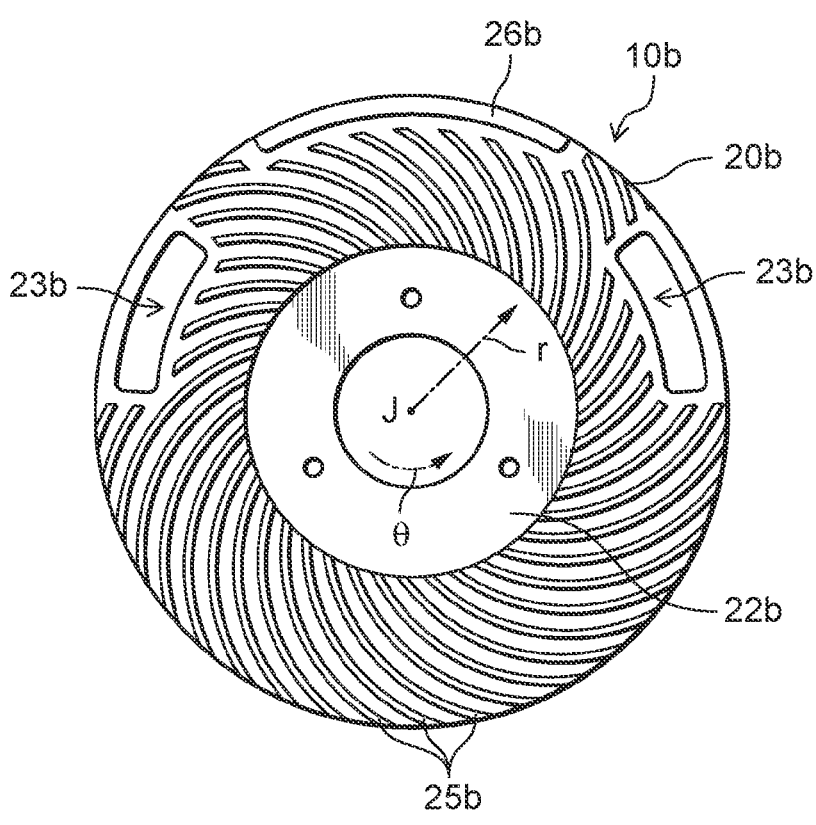
FIG. 10 is a plan view of a phosphor wheel according to a second variation as viewed from a second main surface side.
Figure 11:
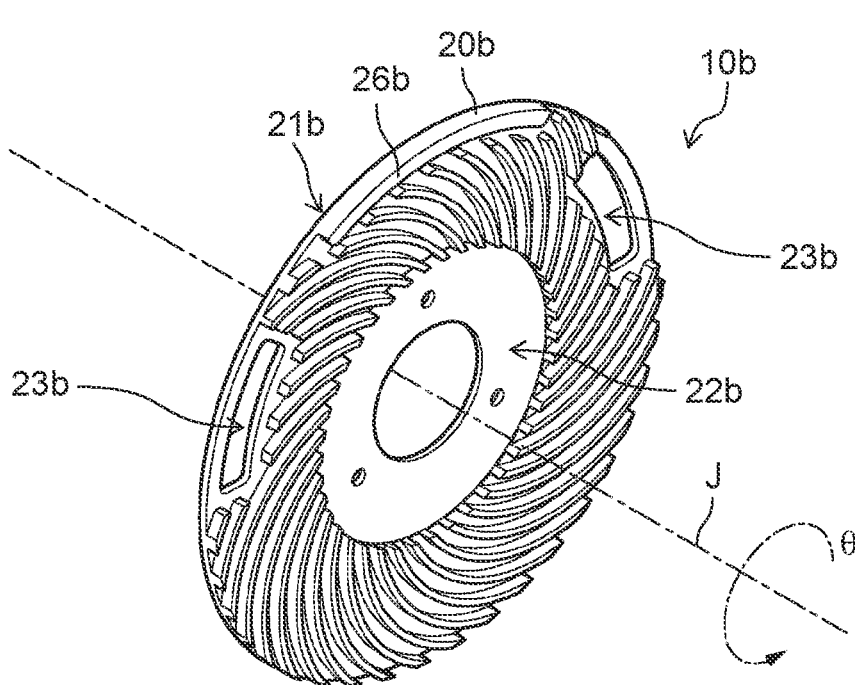
FIG. 11 is a perspective view of the phosphor wheel according to the second variation as viewed from the second main surface side.

In addition, in a case where two openings 23a are provided in substrate 20a as in phosphor wheel 10a, it is not essential that two projections 26a are provided. That is, the number of openings 23a and the number of projections may not coincide with each other. FIG. 10 is a plan view of a phosphor wheel according to a second variation as viewed from a second main surface side. FIG. 11 is a perspective view of the phosphor wheel according to the second variation as viewed from the second main surface side. In the second variation, description of matters similar to the matters of phosphor wheels 10 and 10a will be appropriately omitted, and description will be made focusing on a difference from phosphor wheel 10.

A plan view of phosphor wheel 10b illustrated in FIGS. 10 and 11 as viewed from first main surface 21b is similar to FIG. 8. That is, a configuration of phosphor wheel 10b on first main surface 21b side is similar to phosphor wheel 10a. A plurality of heat dissipation fins 25b are provided on second main surface 22b of substrate 20b included in phosphor wheel 10b. In addition, two openings 23b are provided in substrate 20b.

One projection 26b is provided on second main surface 22b for two openings 23b. Projection 26b has a curved shape along circumferential direction θ and is positioned in an intermediate region between two openings 23a on an outer peripheral side with respect to two openings 23b.

As described above, in a case where two openings 23b are provided in substrate 20b, an imbalance of a mass distribution of phosphor wheel 10b can be reduced even though one projection 26b is provided in an intermediate region between two openings 23b. When projection 26b is arranged to avoid a region near opening 23b, it is possible to prevent the laser light transmitted through opening 23b from hitting projection 26b and becoming stray light (unnecessary light) or a heat source.

[Third Variation]

Figure 12:
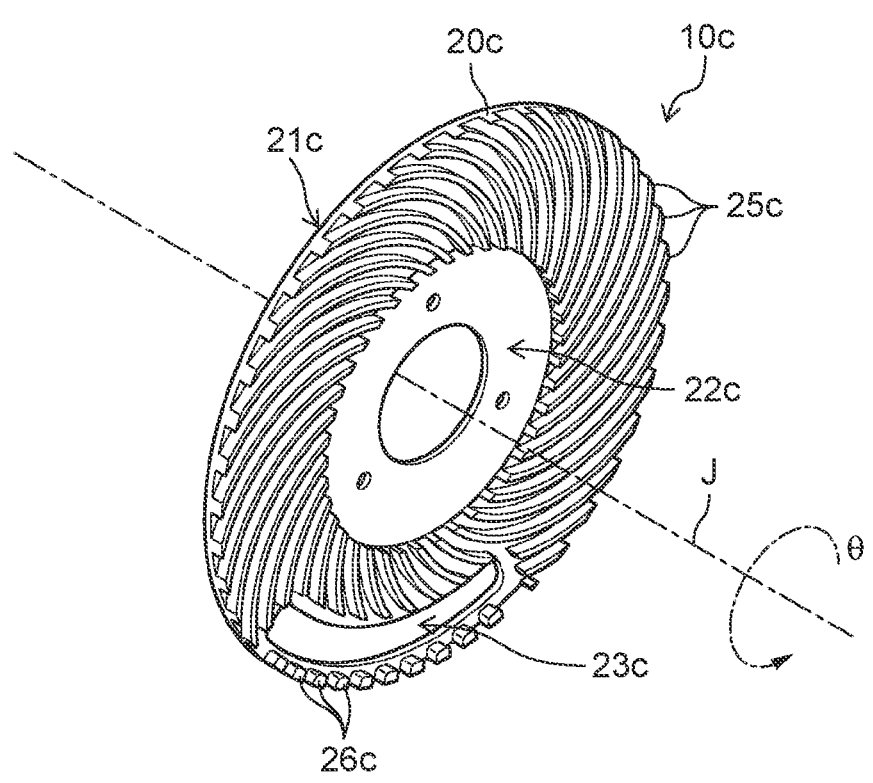
FIG. 12 is a perspective view of a phosphor wheel according to a third variation as viewed from a second main surface side.

In phosphor wheels 10, 10a, 10b, the shape of the projection has a curved shape (in other words, an arc shape) along circumferential direction θ, but the shape of the projection is not particularly limited. FIG. 12 is a perspective view of a phosphor wheel according to a third variation s viewed from a second main surface side. In the third variation, description of matters similar to the matters of phosphor wheel 10 will be appropriately omitted, and description will be made focusing on a difference from phosphor wheel 10.

A plan view of phosphor wheel 10c according to the third variation as viewed from first main surface 21c side is similar to FIG. 5, and thus, the illustration and description thereof are omitted. Opening 23c is provided in substrate 20c included in phosphor wheel 10c. A plurality of heat dissipation fins 25c are provided on second main surface 22c of substrate 20c.

In addition, a plurality of projections 26c are provided on second main surface 22c of substrate 20 in an aspect different from heat dissipation fins 25c. Each of the plurality of projections 26c has a dot shape. The plurality of projections 26 are positioned on the outer peripheral side with respect to opening 23, and the plurality of projections 26c are positioned side by side with opening 23c in radial direction r. In addition, the plurality of projections 26c are positioned side by side along circumferential direction θ.

As described above, an imbalance of a mass distribution of phosphor wheel 10c can also be reduced by the plurality of projections 26c each having the dot shape. Note that, each of the plurality of projections 26c may have a polygonal shape such as a quadrangular shape instead of the dot shape.

[Effects and the Like]

As described above, phosphor wheel 10 includes substrate 20 and having a disk shape and including first main surface 21, second main surface 22 opposite to first main surface 21, and opening 23, and phosphor layer 30 provided on first main surface 21 in a curved shape along circumferential direction θ of substrate 20, and phosphor layer 30 is positioned side by side with opening 23 in circumferential direction θ in plan view. On second main surface 22, heat dissipation fin 25 and projection 26 different from heat dissipation fin 25 are integrally formed with substrate 20.

Consequently, it is possible to reduce the imbalance of the mass distribution of phosphor wheel 10 by projection 26. That is, it can be said that phosphor wheel 10 is a phosphor wheel in which the imbalance of the mass distribution is reduced by projection 26.

In addition, for example, projection 26 is positioned in a region of second main surface 22 on the outer peripheral side with respect to opening 23.

Consequently, it is possible to reduce the imbalance of the mass distribution caused by opening 23 by projection 26 having a mass smaller than a mass reduced by providing opening 23.

In addition, for example, projection 26 is positioned side by side with opening 23 in the radial direction of substrate 20.

Consequently, the region near opening 23 can be structurally reinforced by projection 26.

In addition, for example, projection 26 is formed in a curved shape along circumferential direction θ.

Consequently, the region near opening 23 can be structurally reinforced by projection 26.

In addition, for example, the height of projection 26 is equal to the height of heat dissipation fin 25.

Consequently, the plurality of heat dissipation fins 25 and the plurality of projections 26 can be formed in the same cutting process.

In addition, for example, projection 26 is formed at a position where the imbalance of the mass distribution of phosphor wheel 10 caused by opening 23 is reduced.

Consequently, it is possible to reduce the imbalance of the mass distribution of phosphor wheel 10 by projection 26.

In addition, for example, the residual imbalance of phosphor wheel 10 is less than or equal to the allowable residual imbalance.

Consequently, phosphor wheel 10 in which the residual imbalance is less than or equal to the allowable residual imbalance is realized.

In addition, for example, region 27 of second main surface 22 near opening 23 is flat.

Consequently, it is possible to prevent the laser light transmitted through opening 23 from hitting the plurality of heat dissipation fins 25 and projection 26 and becoming stray light (unnecessary light) or a heat source.

In addition, for example, heat dissipation fins 25 and projection 26 are formed by cutting.

Consequently, heat dissipation fins 25 and projection 26 can be formed by cutting.

In addition, in phosphor wheel 10b, substrate 20b includes the plurality of openings 23 b, and the imbalance of the mass distribution of phosphor wheel 10b is reduced by providing one projection 26b for the plurality of openings 23b.

Consequently, projection 26b can be arranged at a position away from the plurality of openings 23b, and it is possible to prevent the laser light transmitted through opening 23b from hitting projection 26b and becoming stray light (unnecessary light) or a heat source.

In addition, in phosphor wheel 10c, the plurality of projections 26c are formed in the dot shape along circumferential direction θ.

Consequently, the imbalance of the mass distribution of phosphor wheel 10c can be reduced by the plurality of projections 26c each having the dot shape.

In addition, projection image display device 100 includes phosphor wheel 10, motor 113 that rotates phosphor w % heel 10, laser light sources 104a. 104b, and 104c that irradiate phosphor layer 30 with laser light, DMD 129 that modulates light emitted from phosphor layer 30 in accordance with the laser light emitted by laser light sources 104a, 104b, and 104c based on the image signal, and projection lens 130 that projects the light modulated by DMD 129. DMD 129 is an example of the image display element. Projection image display device 100 may include phosphor wheels 10a, 10b, and 10c instead of phosphor wheel 10.

Projection image display device 100 includes phosphor wheel 10 in which the imbalance of the mass distribution is reduced, and thus, the reliability is improved.

Other Exemplary Embodiments

Although the exemplary embodiment has been described above, the present disclosure is not limited to the exemplary embodiment.

For example, in the above exemplary embodiment, the projection is arranged on the outer peripheral side of the substrate with respect to the opening, but may be arranged on the inner peripheral side of the substrate with respect to the opening.

Although the exemplary embodiment has been described above, the present disclosure is not limited to the exemplary embodiment.

In addition, in the above exemplary embodiment, although it has been described that the laser light source is the semiconductor laser, the laser light source may be a laser other than the semiconductor laser. The laser light source may be, for example, a solid laser such as a YAG laser, a liquid laser such as a dye laser, or a gas laser such as an Ar ion laser, a He—Cd laser, a nitrogen laser, or an excimer laser.

In addition, general or specific aspects of the present disclosure may be realized by any of a system, a device, and a method. For example, the present disclosure may be realized as a method for manufacturing a phosphor wheel. Such a manufacturing method includes a process of forming a substrate by cutting and a process of forming a phosphor layer on the formed substrate.

In addition, the present disclosure also includes exemplary embodiments obtained by applying various variations conceived by those skilled in the art to the exemplary embodiments and the variations, and exemplary embodiments realized by arbitrarily combining constituent elements and functions in the exemplary embodiments without departing from the gist of the present disclosure.

INDUSTRIAL APPLICABILITY

The present disclosure is useful as a phosphor wheel used in a projection image display device of a field sequential system.

REFERENCE MARKS IN THE DRAWINGS 10, 10a, 10b, 10c, 10h: phosphor wheel
20, 20a, 20b, 20c, 20h: substrate
21, 21a, 21b, 21c. 21h: first main surface
22, 22a, 22b, 22c, 22h: second main surface
23, 23a, 23b, 23c, 23h, 26h: opening
24: main opening
25, 25a, 25b, 25c, 25h: heat dissipation fin
26, 26a, 26b, 26c: projection
27: region
30, 30a: phosphor layer
30g: green phosphor layer
30r: red phosphor layer
100: projection image display device
104a, 104b, 104c: laser light source
105, 106, 118: condenser lens
107, 139: diffuser plate
108: dichroic mirror
109, 110: excitation lens
113, 120: motor
119: color filter
121: red transmission filter
122: green transmission filter
123: transparent glass
124: rod integrator
125, 126, 132, 134, 136, 138: relay lens
127, 128, 133, 135, 137: mirror
130: projection lens
J: rotation axis
r: radial direction
θ: circumferential direction

The invention claimed is:

1. A phosphor wheel comprising:
a disk-shaped substrate including a first main surface, a second main surface opposite to the first main surface, and an opening;
a phosphor layer having a curved shape and provided on the first main surface along a circumferential direction of the substrate, the phosphor layer being arranged side by side with the opening in the circumferential direction in plan view;
a heat dissipation fin on the second main surface; and
a projection on the second main surface, the projection being different from the heat dissipation fin, wherein the projection is located at a position where an imbalance of a mass distribution of the phosphor wheel caused by the opening is reduced.

2. The phosphor wheel according to claim 1, wherein the projection is located in a region of the second main surface, the region being an outer peripheral side with respect to the opening.

3. The phosphor wheel according to claim 1, wherein the projection is arranged side by side with the opening in a radial direction of the disk-shaped substrate.

4. The phosphor wheel according to claim 1, wherein the projection is arranged along the circumferential direction, and has a curved shape.

5. The phosphor wheel according to claim 1, wherein a plurality of the projections are provided along the circumferential direction of the disk-shaped substrate.

6. The phosphor wheel according to claim 5, wherein each of the plurality of projections has a dot shape.

7. The phosphor wheel according to claim 1, wherein a height of the projection is equal to a height of the heat dissipation fin.

8. The phosphor wheel according to claim 1, wherein the heat dissipation fin and the projection are disposed integrally with the disk-shaped substrate.

9. The phosphor wheel according to claim 1, wherein a residual imbalance of the phosphor wheel is less than or equal to an allowable residual imbalance.

10. The phosphor wheel according to claim 1, wherein a region of the second main surface near the opening is flat.

11. The phosphor wheel according to claim 1, wherein the heat dissipation fin and the projection are formed by cutting.

12. The phosphor wheel according to claim 1, wherein;

the opening has a curved shape, and the opening and the phosphor layer form a ring shape in plan view.

13. A projection image display device comprising:
the phosphor wheel according to claim 1;
a motor configured to rotate the phosphor wheel;
a laser light source configured to irradiate the phosphor layer of the phosphor wheel with laser light;
an image display element configured to modulate light emitted from the phosphor layer of the phosphor wheel in accordance with laser light emitted by the laser light source based on an image signal; and
a projection lens configured to project the light modulated by the image display element.

14. The phosphor wheel according to claim 1, wherein:
the opening of the disk-shaped substrate is one of a plurality of openings of the disk-shaped substrate, and
an imbalance of a mass distribution of the phosphor wheel is reduced by providing one projection for the plurality of openings.

15. A phosphor wheel comprising:
a disk-shaped substrate including a first main surface, a second main surface opposite to the first main surface, and an opening;
a phosphor layer having a curved shape and provided on the first main surface along a circumferential direction of the disk-shaped substrate, the phosphor layer being arranged side by side with the opening in the circumferential direction in plan view;
a heat dissipation fin on the second main surface; and
a projection on the second main surface, the projection being different from the heat dissipation fin, and the heat dissipation fin and the projection being disposed integrally with the disk-shaped substrate,
wherein the opening of the disk-shaped substrate is one of a plurality of openings of the disk-shaped substrate, and
wherein an imbalance of a mass distribution of the phosphor wheel is reduced by providing one projection for the plurality of openings.

* * * * *